(12) United States Patent
Kim et al.

(10) Patent No.: US 6,731,392 B2
(45) Date of Patent: May 4, 2004

(54) MARKER USED FOR MEASURING DISPLACEMENT OF MOVING OBJECT AND METHOD THEREFOR

(75) Inventors: Seok Ho Kim, Seoul (KR); Sam Yong Chung, Seoul (KR); Song Soo Han, Seoul (KR); Sang Heon Lee, Yongin-si (KR); Bum Jae You, Seoul (KR); Sang Rok Oh, Seoul (KR); Mee Seub Lim, Seoul (KR)

(73) Assignee: Samsung Corporation, Seoul (KR)

( * ) Notice: Subject to any disclaimer, the term of this patent is extended or adjusted under 35 U.S.C. 154(b) by 264 days.

(21) Appl. No.: 10/020,298

(22) Filed: Dec. 18, 2001

(65) Prior Publication Data

US 2003/0030820 A1 Feb. 13, 2003

(30) Foreign Application Priority Data

Jun. 29, 2001 (KR) .................................. 10-2001-38229

(51) Int. Cl.$^7$ ................................................ G01B 11/14
(52) U.S. Cl. ...................................... 356/620; 356/614
(58) Field of Search ................................ 356/620, 614, 356/615; 33/700

(56) References Cited

U.S. PATENT DOCUMENTS 4,550,250 A * 10/1985 Mueller et al. .......... 250/208.2
5,598,270 A * 1/1997 Meisser et al. ............. 356/400

* cited by examiner

Primary Examiner—Frank G. Font
Assistant Examiner—Roy M. Punnoose
(74) Attorney, Agent, or Firm—Lowe Hauptman Gilman & Berner LLP

(57) ABSTRACT

The present invention discloses a displacement measurement marker capable of measuring displacement of an object moving on a plane by using a line scan camera, and a displacement measurement method using the same. The displacement measurement marker according to the present invention comprises a plurality of repeatedly arranged figures having the same size and shape. Each of the figures is measurable by means of the line scan camera and is asymmetric with respect to a direction of a scan line of the line scan camera. Preferably, each of the figures is a right-angled triangle of which base is a horizontal line. According to the present invention, there are advantages in that a two-dimensional planar motion of the object can be measured from one-dimensional linear image data, and the motion of the object which moves at a high speed or on which an impact is exerted can be accurately measured.

6 Claims, 13 Drawing Sheets

MARKER USED FOR MEASURING DISPLACEMENT OF MOVING OBJECT AND METHOD THEREFOR

BACKGROUND OF THE INVENTION

1. Field of the Invention

The present invention relates to a marker used for measuring displacements of a moving object, and more particularly, to a marker used for measuring displacement of an object moving on a plane by using a line scan camera and a method for measuring the displacements of the moving object.

2. Description of the Prior Art

Generally, displacements of a moving object are measured in various methods. For example, there is a method of measuring the displacements of the moving object from two-dimensional image data on the moving object which has been continuously photographed by a two-dimensional image camera.

However, when the displacements of the moving object are measured by the two-dimensional image camera, a large volume of the two-dimensional data of the moving object is obtained. Thus, there is a shortcoming in that a measurement speed is slow. As a result, in a case where the object moves at a high speed or any impact is exerted on the object, there is limitation that the displacements of the object cannot be measured. On the other hand, the line scan camera employed in the present invention photographs one-dimensional linear images which are composed of one dimensional array of pixels. Thus, although the line scan camera is restrictive as compared with the two-dimensional image camera when obtaining the image data, it has an advantage that the image data can be obtained at a very high speed.

SUMMARY OF THE INVENTION

Accordingly, the present invention is contemplated to solve the aforementioned problem produced when a conventional two-dimensional image camera measures displacement of a moving object. An object of the present invention is to provide a marker used for measuring displacement of an object moving on a plane and a method for measuring the displacement of the moving object by using a line scan camera capable of measuring a two-dimensional planar motion of the object from one-dimensional linear image data of the object.

Another object of the present invention is to provide a marker used for measuring displacement of an object moving on a plane and a method for measuring the displacement of the moving object by using a line scan camera capable of precisely measuring an object which moves at a high speed or on which any impact is exerted.

According to an aspect of the present invention for achieving the above objects, there is provided a marker used for measuring displacement of a moving object by using a line scan camera, comprising a plurality of repeatedly arranged figures having the same size and shape, each of the figures being measurable by means of the line scan camera and asymmetric with respect to a direction of a scan line of the line scan camera. Preferably, each of the figures may be a right-angled triangle of which base is a horizontal line.

According to another aspect of the present invention, there is provided a method for measuring displacement of a moving object by using a line scan camera, comprising the steps of fixedly attaching a displacement measurement marker to a surface of the moving object, the marker comprising a plurality of repeatedly arranged figures having the same size and shape, each of the figures being measurable by means of the line scan camera and asymmetric with respect to a direction of a scan line of the line scan camera; setting coordinate systems of the displacement measurement marker, and obtaining general functional formulas for two lines of an n-th (n= ..., −3, −2, −1, 0, 1, 2, 3, ...) figure of the displacement measurement marker at time t=0; obtaining general equations for intersection points between the scan line and the n-th two lines; obtaining two general distance ratios of the intersection points for an arbitrary integer of n from the general equation for the two intersection points; obtaining a general functional formula for the scan line having a gradient a and a y-intercept b for expressing as a general equation for the arbitrary integer of n from the two distance ratios; continuously photographing the displacement measurement marker moving together with the object by the line scan camera; obtaining two actual distance ratios from images photographed by the line scan camera; substituting the two actual distance ratios obtained from the images into the general equation having the gradient a and the y-intercept b so as to obtain an actual functional formula for the scan line; obtaining a central coordinate $P_C$ of the scan line by means of the actual functional formula for the scan line; and obtaining a relative displacement and a rotational angle between central coordinates of the scan line obtained for arbitrary time between t=0 and t=t.

BRIEF DESCRIPTION OF THE DRAWINGS

The above objects and features of the present invention will become apparent from the following description of preferred embodiments given in connection with the accompanying drawings, in which.

DETAILED DESCRIPTION OF THE INVENTION

Hereinafter, preferred embodiments of a marker used for measuring displacement of an object moving on a plane and a method for measuring the displacement of the moving object by using a line scan camera according to the present invention will be explained in detail with reference to the accompanying drawings.

Figure 1:
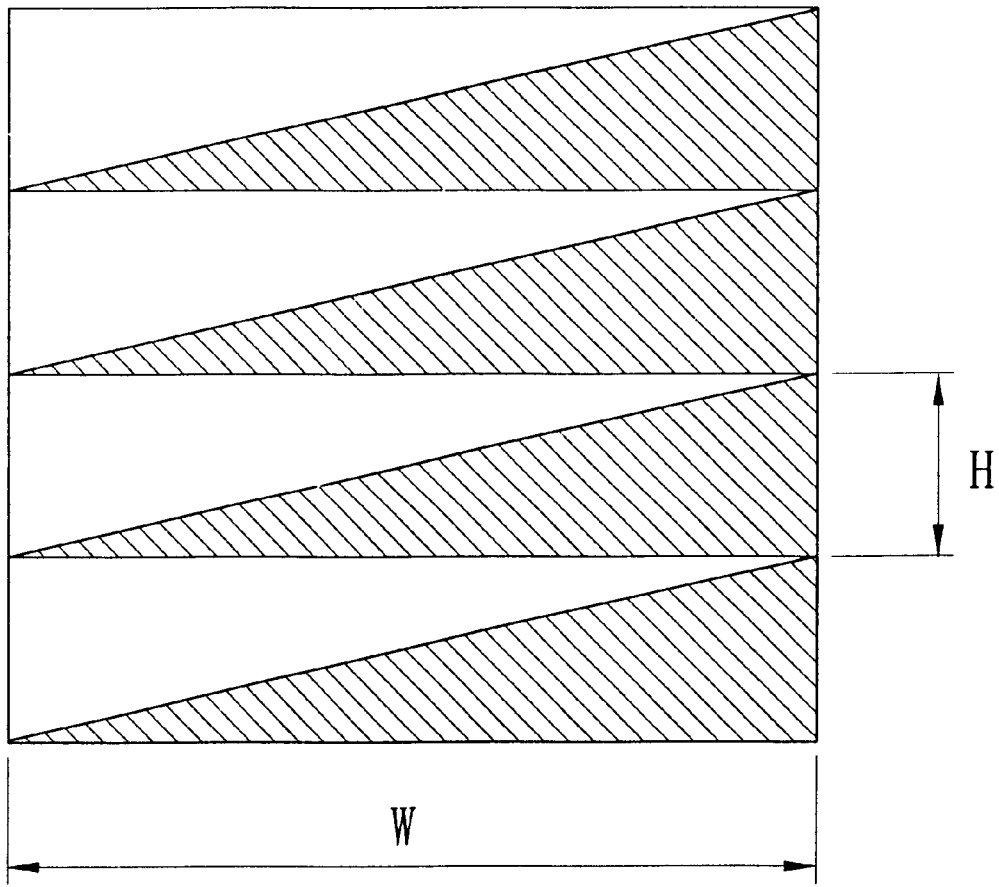
FIG. 1 is a view showing triangular figures according to a preferred embodiment of a displacement measurement marker of the present invention.
Figure 4:
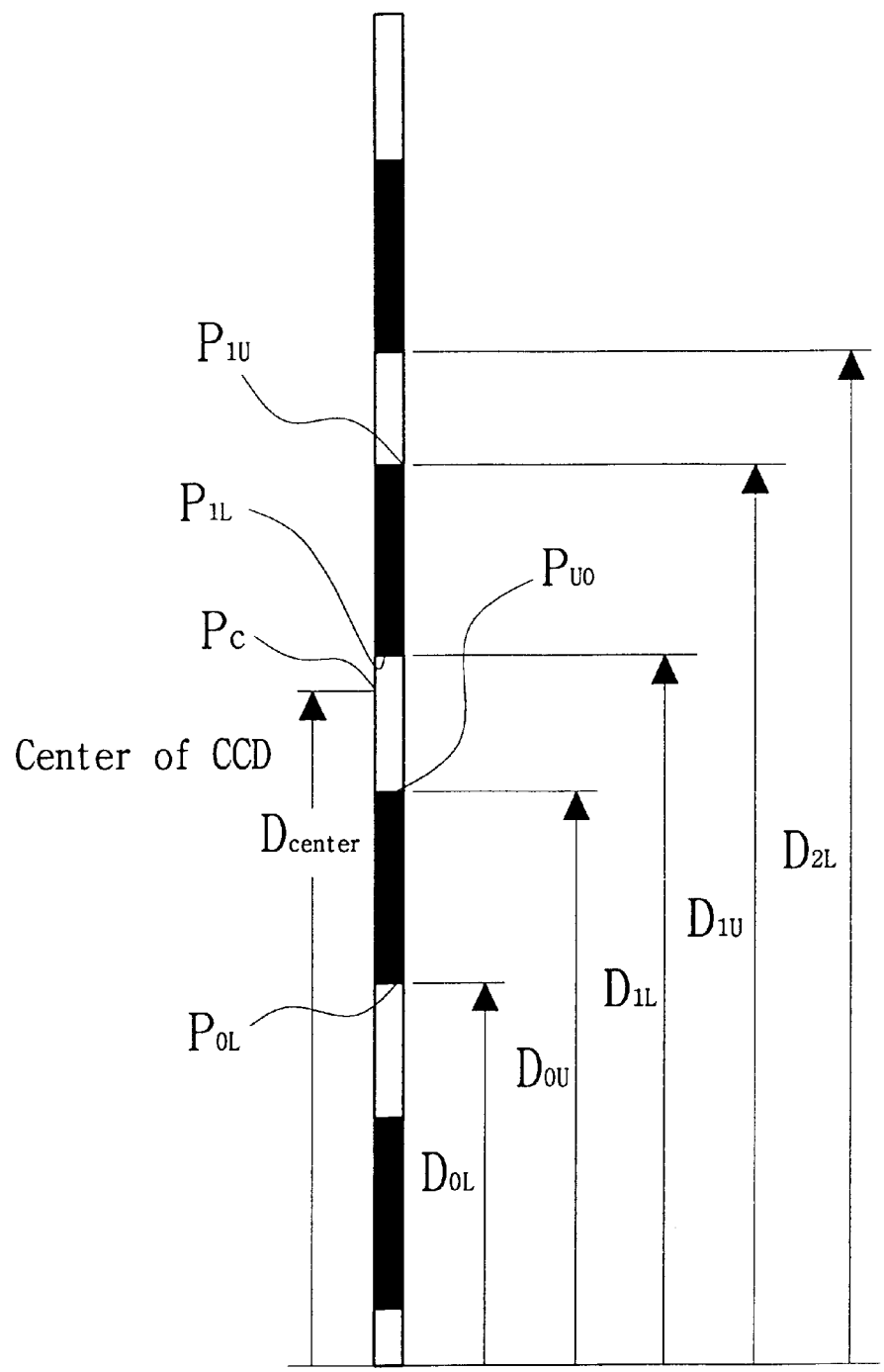
FIG. 4 is a view showing an image of the triangular figures captured in a charge coupled device (CCD) of a line scan camera.

First, a shape of a triangular figure according to a preferred embodiment of the displacement measurement marker of the present invention will be described with reference to FIG. 1. The displacement measurement marker is constructed to comprise a plurality of white and black right-angled triangular figures that are continuously and repeatedly arranged in a vertical direction thereof. In FIG. 1, FIG. 2, and FIG. 7a to FIG. 7e, hatching is shown instead of the black for the convenience of drawing explanation. Each of the right-angled triangular figures has a height H and a base length W. The displacement measurement marker configured as such is fixedly attached to a surface of the moving object which performs vertical, horizontal, rotational motions on the plane. The digital line scan camera (not shown) is installed to be spaced far apart from the displacement measurement marker in a direction perpendicular to a plane of the marker, and photographs the displacement measurement marker. As shown in FIG. 4, an image of the displacement measurement marker, which is composed of a plurality of alternating black and white stripes, is formed in a charge coupled device (CCD).

Figure 2:
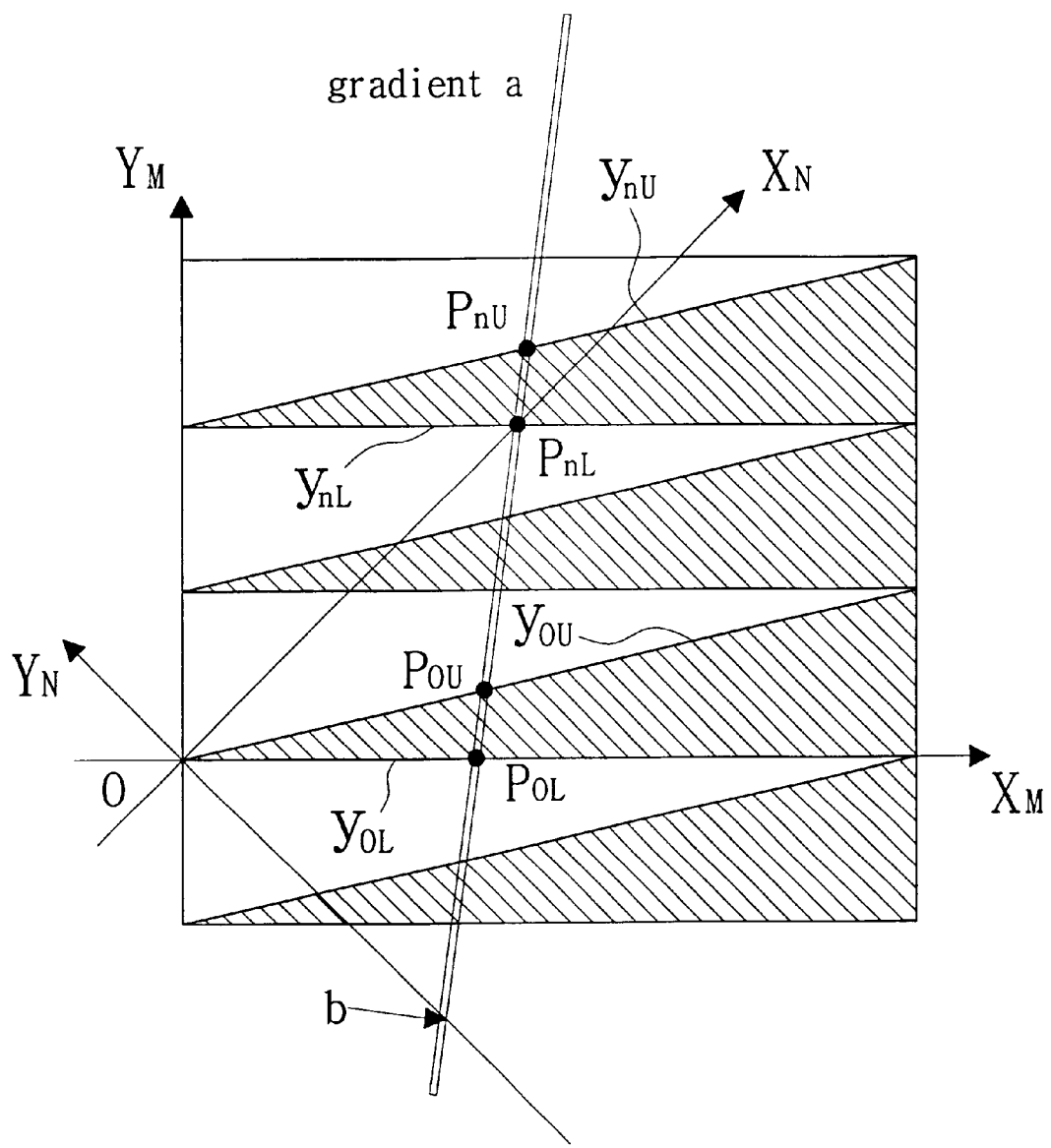
FIG. 2 is a view showing coordinate systems established for calculating a general functional formula for a scan line and information on the triangular figures of the measurement marker.

Referring to FIG. 2, a coordinate system on the displacement measurement marker is referred to as $(X_M, Y_M)$, and a coordinate system rotated counterclockwise by 45 degrees with respect to the coordinate system $(X_M, Y_M)$ is defined as $(X_N, Y_N)$. The rotation angle is merely determined as 45 degrees for simplicity of understanding and calculation, but it may be set otherwise. A general functional formula of a scan line formed in the CCD of the line scan camera is expressed in the coordinate system $(X_N, Y_N)$ and is then defined as the equation, y=ax+b. At this time, the general functional formulas of the horizontal and oblique lines of the triangle on the displacement measurement marker for an n-th figure (n= . . . , −3, −2, −1, 0, 1, 2, 3, . . . ), which are expressed in the coordinate system $(X_N, Y_N)$, are as follows:

$$y_{nL} = -x + n\sqrt{2}H \qquad \text{[Equation (1)]}$$

$$y_{nU} = -\frac{W-H}{W+H}x + \frac{n\sqrt{2}\,WH}{W+H} \qquad \text{[Equation (2)]}$$

Figure 3A:
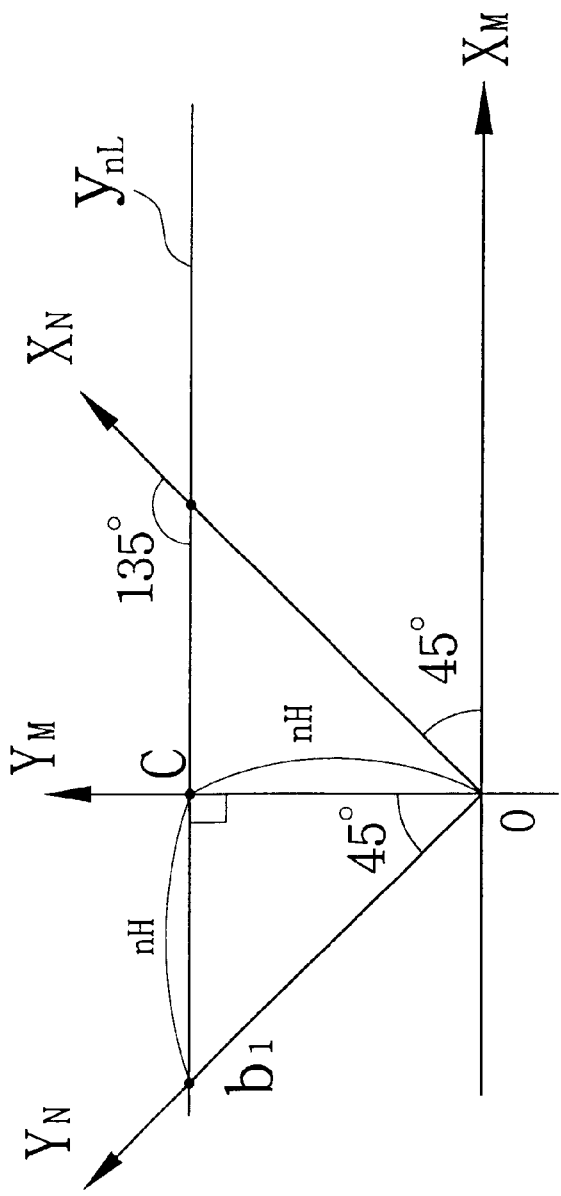
FIGS. 3a and 3b are views showing graphs used for calculating general functional formulas of horizontal and oblique lines of an n-th right-angled triangle.

A process of deriving Equations (1) and (2) will be explained in detail. First, Equation (1) is derived with reference to FIG. 3a. Since an n-th horizontal line $y_{nL}$ shown in FIG. 3a is inclined by 135 degrees with respect to the coordinate system $(X_N, Y_N)$, its gradient has a value of −1. Then, a y-intercept, $b_1$, will be calculated from the relationship, $Ob_1^2 = OC^2 + Cb_1^2$. Since $OC = Cb_1 = nH$, $b_1 = Ob_1 = n\sqrt{2}H$. Thus, the functional formula of the n-th horizontal line is expressed as Equation (1).

Figure 3B:
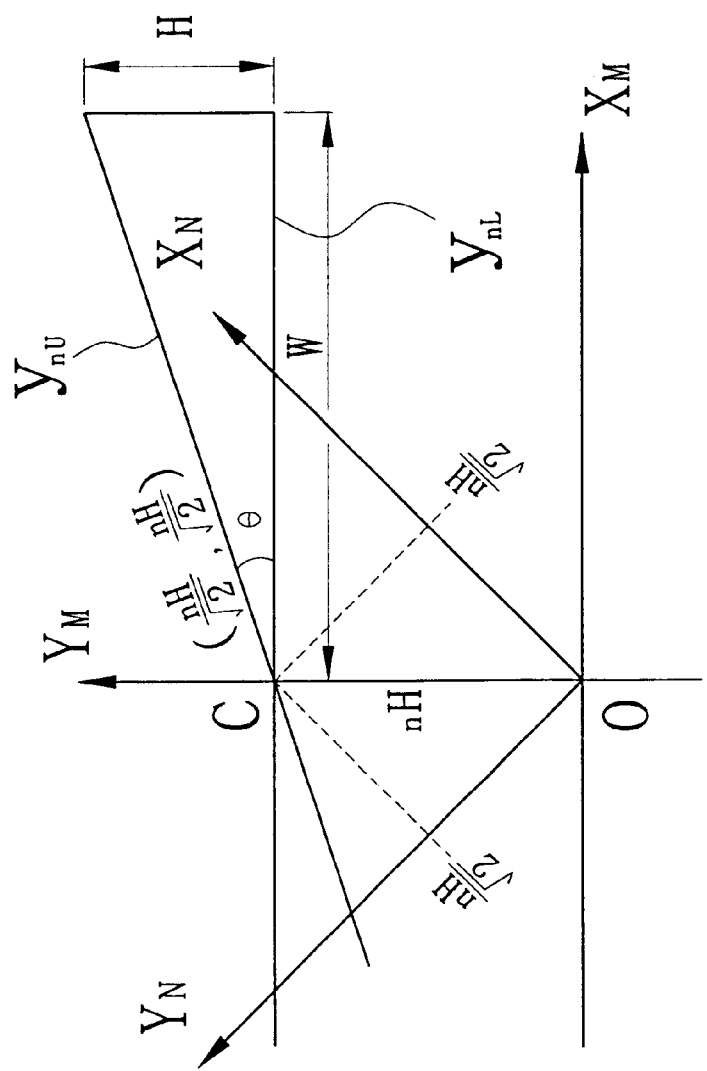

Next, Equation (2) will be derived with reference to FIG. 3b. Assume that the functional formula of an n-th oblique line is $y_{nU} = a_2x + b_2$. The n-th oblique line has a functional formula obtained by parallel translating a 0-th horizontal line, $y_{0L} = -x$, by $OC(nH/\sqrt{2}, nH/\sqrt{2})$ and then rotating it by θ with respect to a C point as a rotating center. Thus, the n-th oblique line which has been coordinate-transformed by using Equation (16) to be described hereinafter is expressed as the following Equation (3).

$$\begin{pmatrix} x' \\ y' \end{pmatrix} = \begin{bmatrix} \cos\theta & \sin\theta \\ -\sin\theta & \cos\theta \end{bmatrix} \begin{pmatrix} x - \frac{nH}{\sqrt{2}} \\ y - \frac{nH}{\sqrt{2}} \end{pmatrix} \qquad \text{[Equation (3)]}$$

where $$\sin\theta = \frac{H}{\sqrt{W^2+H^2}}, \cos\theta = \frac{W}{\sqrt{W^2+H^2}}.$$

By substituting the values x' and y' calculated from Equation (3) into the functional formula of the 0-th horizontal line, $y_{0L} = -x$, Equation (2) is obtained.

The value n expressed in Equations (1) and (2) becomes 0 when the horizontal and oblique lines intersect at the origin of the coordinate system $(X_N, Y_N)$. The horizontal and oblique lines located above the 0-th horizontal and oblique lines of which the value n is zero have positive n-values that are incremented by 1, whereas the horizontal and oblique lines located below the 0-th horizontal and oblique lines of which the value n is zero have negative n-values that are decremented by 1.

Next, intersection points between the scan line, y=ax+b, and the n-th horizontal line $y_{nL}$ of the displacement measurement marker expressed as Equation (1) and between the scan line, y=ax+b, and the n-th oblique line $y_{nU}$ of the displacement measurement marker expressed as Equation (2) are given, respectively, as Equations (4) and (5). Equation (4) is a coordinate value of the intersection point between the scan line and the n-th horizontal line, and Equation (5) is a coordinate value of the intersection point between the scan line and the n-th oblique line.

$$P_{nL} = \left( \frac{n\sqrt{2}\,H - b}{a+1}, \frac{n\sqrt{2}\,aH + b}{a+1} \right) \qquad \text{[Equation (4)]}$$

$$P_{nU} = \left( \frac{n\sqrt{2}\,WH - b(W+H)}{(a+1)W + (a-1)H}, \frac{n\sqrt{2}\,aWH + b(W-H)}{(a+1)W + (a-1)H} \right) \qquad \text{[Equation (5)]}$$

Since the intersection points between the scan line and the horizontal and oblique lines of the displacement measurement marker are calculated from the above Equations, lengths of white and black stripes of the image which are overlapped with the scan line can be calculated. Thus, a black stripe length to white stripe length ratio can be calculated from the following Equation (6).

$$L_n = \frac{l_{nU}}{l_{nL}} = \frac{(a+1)W + (a-1)H}{n(1-a)H - \sqrt{2}\,b} - 1 \qquad \text{[Equation (6)]}$$

where $l_{nL}$ is a length of the black stripe corresponding to a distance from $P_{nL}$ to $P_{nU}$, and $l_{nU}$ is a length of the white stripe corresponding to a distance from $P_{nU}$ to $P_{(n+1)L}$.

If two $L_n$ and $L_m$ have been already known with respect to the arbitrary integers of n and m, the gradient a and y-intercept b of the functional formula of the scan line can also be calculated. If the two known black stripe length to white stripe length ratios are defined, respectively, as $L_n$ and $L_m$, the $L_n$ and $L_m$ are expressed as the following Equations (7) and (8).

$$L_n = \frac{(a+1)W + (a-1)H}{n(1-a)H - \sqrt{2}\,b} - 1 \qquad \text{[Equation (7)]}$$

$$L_m = \frac{(a+1)W + (a-1)H}{m(1-a)H - \sqrt{2}\,b} - 1 \qquad \text{[Equation (8)]}$$

The values a and b calculated from Equations (7) and (8) are expressed as the following Equations (9) and (10).

$$a = \frac{(L_n - L_m)W + \{L_m - L_n + (L_m + 1)(L_n + 1)(n - m)\}H}{(L_m - L_n)W + \{L_m - L_n + (L_m + 1)(L_n + 1)(n - m)\}H} \quad \text{[Equation (9)]}$$

$$b = \frac{\sqrt{2}\,WH\{m(L_m + 1) - n(L_n + 1)\}}{(L_m - L_n)W + \{L_m - L_n + (L_m + 1)(L_n + 1)(n - m)\}H} \quad \text{[Equation (10)]}$$

Since the values a and b are calculated from Equations (9) and (10), the functional formula of the scan line, y=ax+b, is obtained. Thus, by using the obtained values a and b, relative positions of the displacement measurement marker with respect to the scan line can be obtained.

Next, a process of calculating the displacement of moving object from the image captured in the CCD of the line scan camera will be explained with reference to FIG. 4. The two black stripe and white stripe length ratios can be calculated from the data on five boundaries defined between the black and white stripes located near a central region of the CCD. For the sake of convenience, the boundary where the white stripe is changed to the black stripe just below a border of the central region of the CCD is determined to have the value n of 0. Thus, the two length or distance ratios can be calculated from the following Equation (11).

$$L_0 = \frac{D_{1L} - D_{0U}}{D_{0U} - D_{0L}} \quad \text{[Equation (11)]}$$

$$L_1 = \frac{D_{2L} - D_{1U}}{D_{1U} - D_{1L}}$$

$L_0$ and $L_1$ are length or distance ratios, and thus, become non-dimensional values. By using the two length ratios $L_0$ and $L_1$, and the base length W and height H corresponding to a size of the displacement measurement marker, the values a and b of the functional formula of the scan line, y=ax+b, can be calculated. That is, if the values $L_0$, $L_1$, W and H are substituted into Equations (9) and (10), the values a and b are calculated from the following Equations (12) and (13). Therefore, the general functional formula for the scan line can be obtained in such a way.

$$a = \frac{(L_1 - L_0)W + \{L_0 - L_1 + (L_0 + 1)(L_1 + 1)\}H}{(L_0 - L_1)W + \{L_0 - L_1 + (L_0 + 1)(L_1 + 1)\}H} \quad \text{[Equation (12)]}$$

$$b = \frac{-\sqrt{2}\,WH(L_1 + 1)}{(L_0 - L_1)W + \{L_0 - L_1 + (L_0 + 1)(L_1 + 1)\}H} \quad \text{[Equation (13)]}$$

Figure 5:
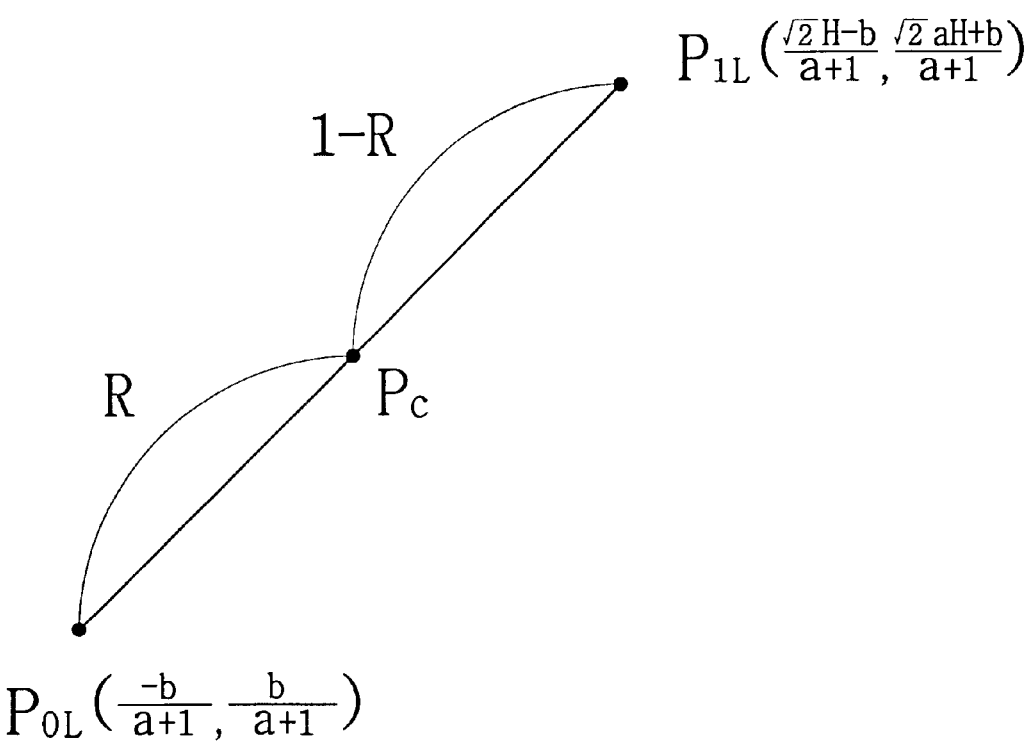
FIG. 5 is a view showing a graph used for calculating a central coordinate of the scan line.

Next, calculation of a central coordinate of the scan line will be explained with reference to FIG. 5. It is assumed that the intersection point between the scan line and the 0-th horizontal line $Y_{0L}$ is $P_{0L}$ and the intersection point between the scan line and the first horizontal line $Y_{1L}$ is $P_{1L}$. Thus, the central coordinate $P_C$ of the scan line becomes a point obtained by internally dividing the length between the two points $P_{0L}$ and $P_{1L}$ by an R to (1−R) ratio, and is expressed as the following Equation (14).

$$P_c = RP_{1L} + (1 - R)P_{0L} \quad \text{[Equation (14)]}$$

where $$R = \frac{D_{1L} - D_{center}}{D_{1L} - D_{0L}}.$$

From Equation (4), because of $$P_{0L} = \left(\frac{-b}{a+1}, \frac{b}{a+1}\right)$$

and $$P_{1L} = \left(\frac{\sqrt{2}\,H - b}{a+1}, \frac{\sqrt{2}\,aH + b}{a+1}\right),$$

when substituting these values $P_{0L}$ and $P_{1L}$ into Equation (14), the central coordinate $P_C$ of the scan line is expressed as the following Equation (15).

$$P_c = \left(\frac{-b + \sqrt{2}\,HR}{a+1}, \frac{b + \sqrt{2}\,aHR}{a+1}\right) \quad \text{[Equation (15)]}$$

Figure 6:
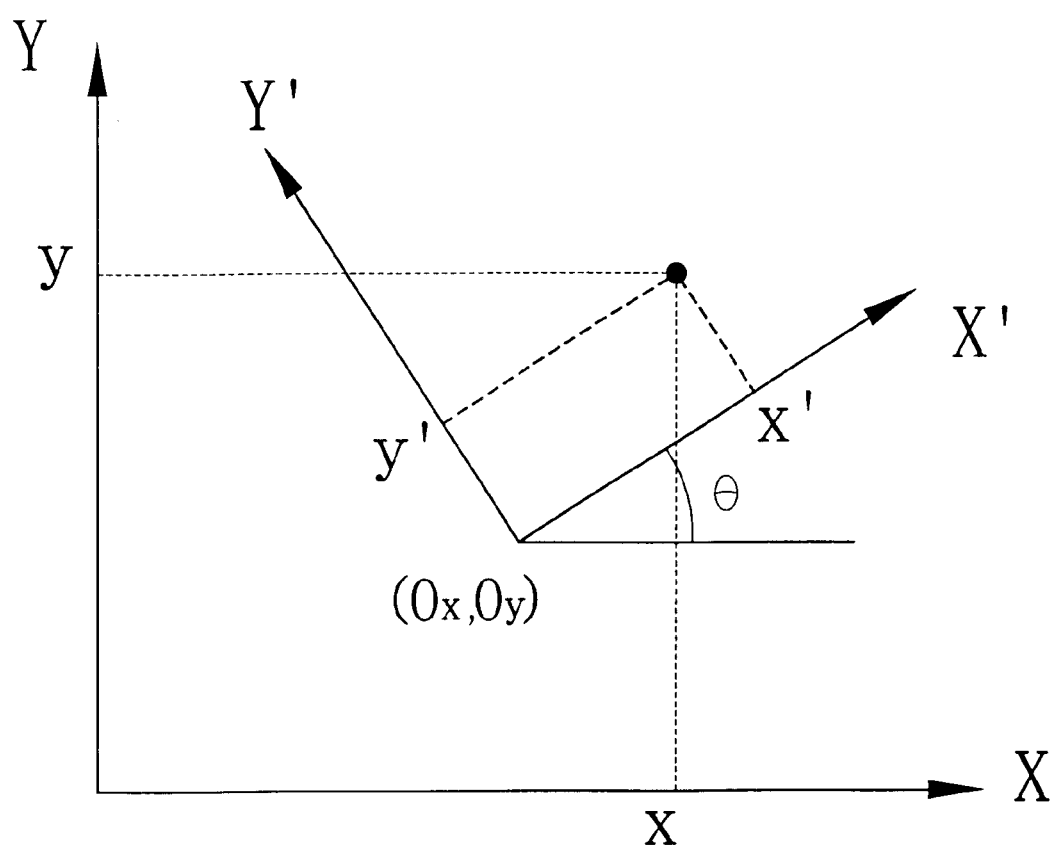
FIG. 6 is a view showing a graph for explaining a general coordinate transformation.

Hereinafter, a coordinate transformation of the coordinate system will be explained with reference to FIG. 6. That is, in order to describe the motion of the displacement measurement marker with respect to the central coordinate of the scan line, the coordinate transformation into the coordinate system fixed to the scan line should be made. A general coordinate transformation is performed as follows. As shown in FIG. 6, a new coordinate system (X', Y') obtained by parallel translating a coordinate system (X, Y) by ($O_x$, $O_y$) and then rotating the coordinate system by θ degrees is first defined. The relationship between a point (x, y) in the coordinate system (X, Y) and a point (x', y') in the coordinate system (X', Y') is expressed as the following Equation (16).

$$\begin{pmatrix} x' \\ y' \end{pmatrix} = \begin{bmatrix} \cos\theta & \sin\theta \\ -\sin\theta & \cos\theta \end{bmatrix} \begin{pmatrix} x - O_x \\ y - O_y \end{pmatrix} \quad \text{[Equation (16)]}$$

Here, a coordinate system ($X_C$, $Y_C$) where the center of the scan line becomes the origin thereof and an upward direction of the scan line becomes a y-axis thereof is first defined. Then, the scan line is expressed in this coordinate system.

The central coordinate $P_{C0}$ of the scan line at time t=0 is expressed as Equation (17) by suffixing a subscript 0 to respective parameters in Equation (15).

$$P_{c0} = \left(\frac{-b_0 + \sqrt{2}\,HR_0}{a_0 + 1}, \frac{b_0 + \sqrt{2}\,a_0 HR_0}{a_0 + 1}\right) \quad \text{[Equation (17)]}$$

-continued when $t = 0$

Then, the central coordinate $P_{Ct}$ of the scan line at time t=t is expressed as Equation (18) by suffixing a subscript t to respective parameters in Equation (15).

$$P_{ct} = \left( \frac{-b_t + \sqrt{2}\, HR_t}{a_t + 1}, \frac{b_t + \sqrt{2}\, a_t HR_t}{a_t + 1} \right) \quad \text{[Equation (18)]}$$

when $t = t$

The relative displacement of the displacement measurement marker between time t=t and time t=0, which is expressed in the coordinate system $(X_N, Y_N)$ rotated by 45 degrees with respect to the initially defined coordinate system $(X_M, Y_M)$, will be expressed in the coordinate system $(X_C, Y_C)$ which is the coordinate system at t=0. At this time, since $\theta_0 = \tan^{-1} a_0$ and a rotational angle between the two coordinate systems becomes $\theta_0 - \pi/2$, the relative displacement of the marker is expressed as the following Equation (19).

$$\begin{pmatrix} \Delta x_t \\ \Delta y_t \end{pmatrix} = \begin{bmatrix} \cos(\theta_0 - \pi/2) & \sin(\theta_0 - \pi/2) \\ -\sin(\theta_0 - \pi/2) & \cos(\theta_0 - \pi/2) \end{bmatrix} \quad \text{[Equation (19)]}$$

$$(P_{c0} - P_{ct}) = \begin{bmatrix} \sin\theta_0 & -\cos\theta_0 \\ \cos\theta_0 & \sin\theta_0 \end{bmatrix} (P_{c0} - P_{ct})$$

In addition, the relative rotational angle becomes $\Delta\theta_t = \tan^{-1}\alpha_t - \tan^{-1}\alpha_0$.

Figure 7A:
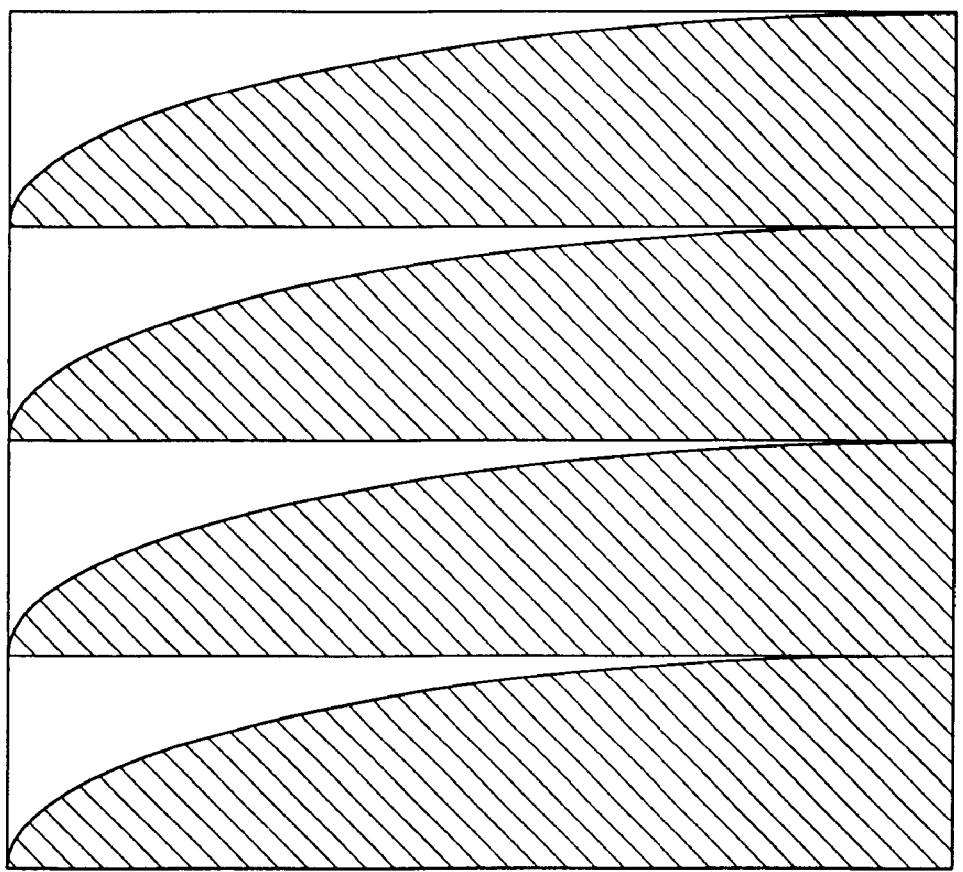
FIGS. 7a to 7e are views of displacement measurement markers according to the other preferred embodiments of the present invention.
Figure 7B:
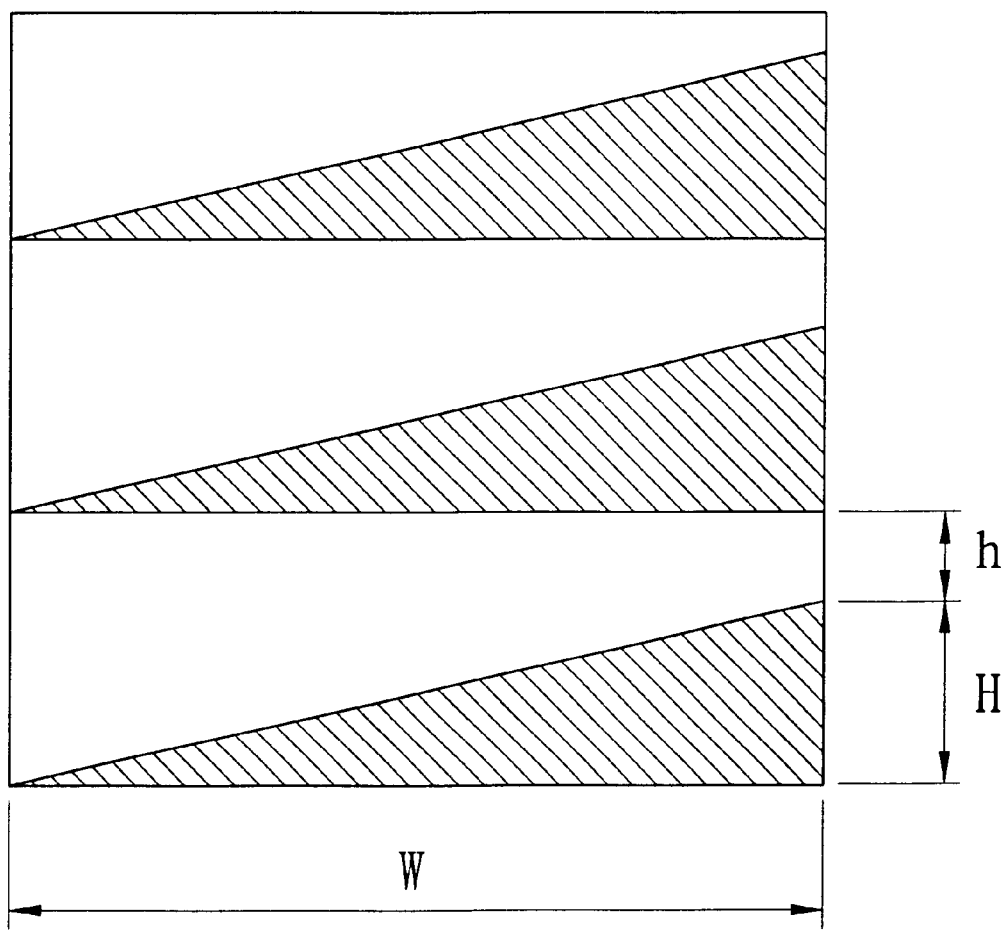
Figure 7C:
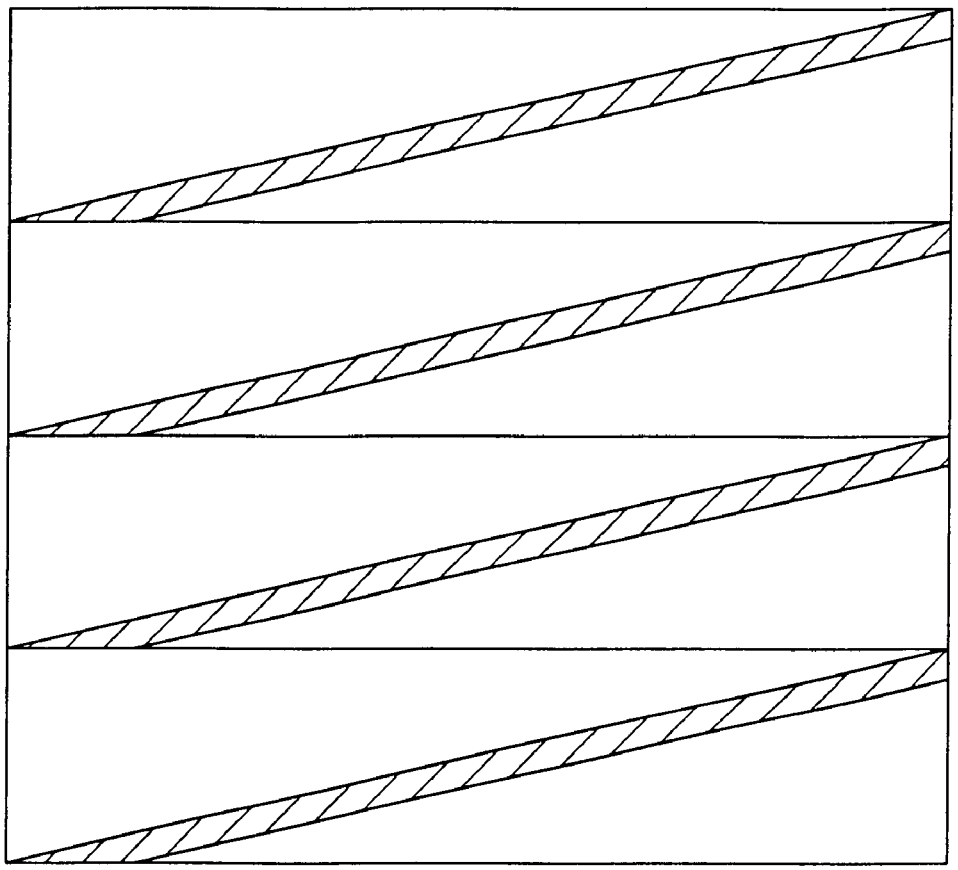
Figure 7D:
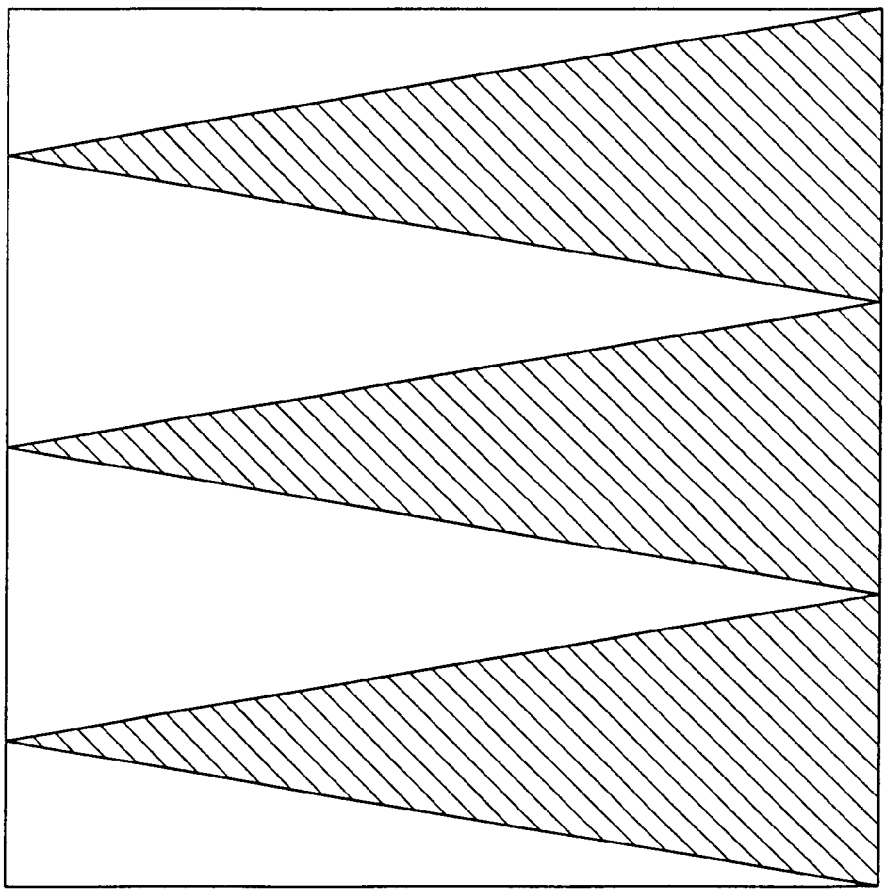
Figure 7E:
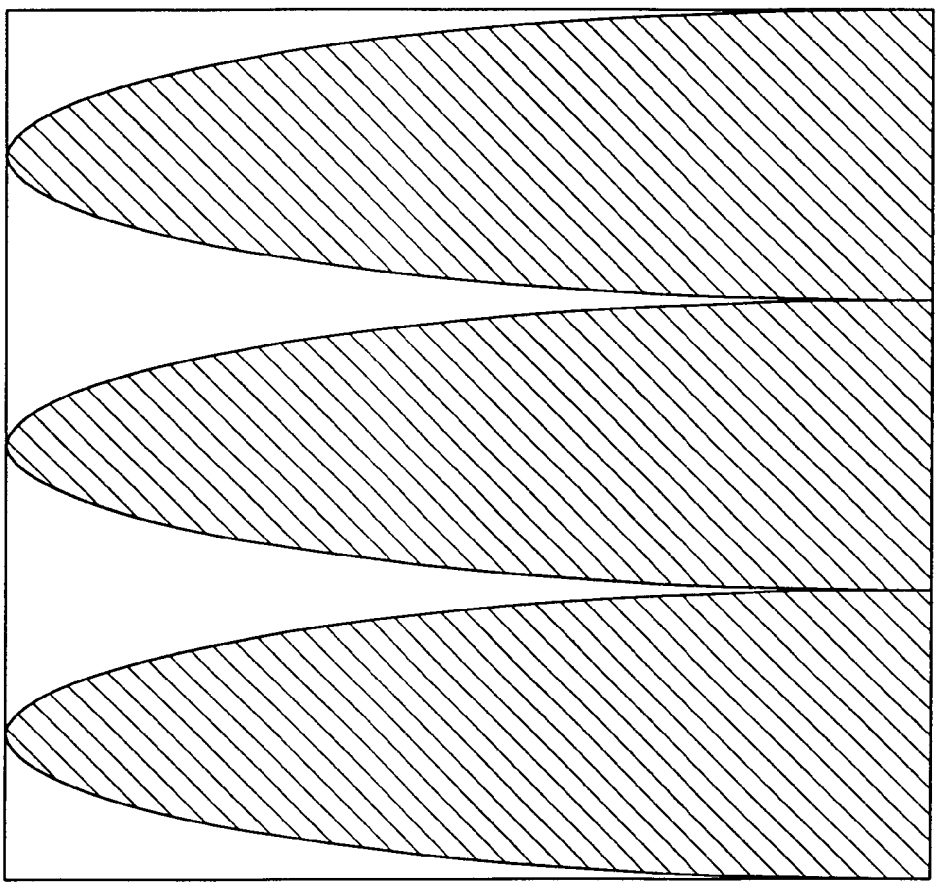

Although the displacement measurement using the triangular figures shown in FIG. 1 has been described above, the displacement measurement using the line scan camera according to the present invention can be made even by means of the other shaped figures other than the triangular figure. FIGS. 7a to 7e show other preferred embodiments of the displacement measurement markers according to the present invention. FIG. 7a shows a marker comprised of a plurality of continuously arranged figures each of which end points of two orthogonal lines constructing a base and height of the figure are connected to each other by a curved line. FIG. 7b shows a marker in which the triangular figures shown in FIG. 1 are spaced apart from one another at a predetermined interval h. FIG. 7c shows a marker in which the width of a hypotenuse of each triangular figure shown in FIG. 1 is set to be larger than that of a base thereof. FIGS. 7d and 7e shows other preferred embodiments of the displacement measurement marker according to the present invention. FIGS. 7a to 7e shows typical preferred embodiments of the displacement measurement marker according to the present invention. The displacement measurement marker according to the present invention is not limited thereto, and various changes and modifications can be made thereto. The displacement measurement marker according to the present invention includes all markers in which a plurality of figures each of which is asymmetric with respect to the scan line direction of the line scan camera and has the same size and shape are repeatedly arranged.

Figure 8:
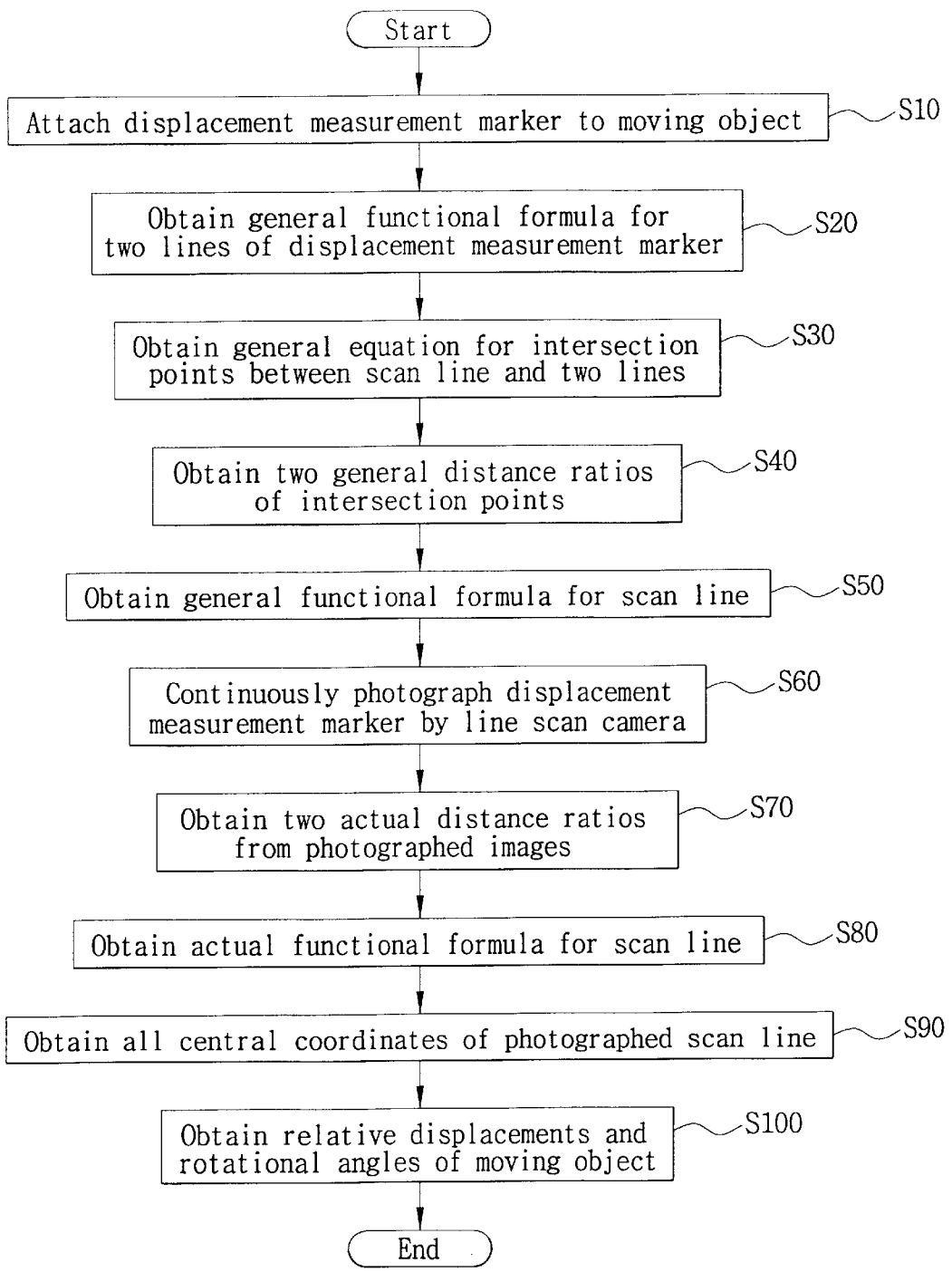
FIG. 8 is a flowchart for illustrating a displacement measurement method according to the present invention.

Hereinafter, a displacement measurement method using the displacement measurement marker according to the present invention will be explained with reference to FIGS. 8 and 2 and the above descriptions of the various displacement measurement markers.

First, the displacement measurement marker according to the present invention is fixedly attached to a surface of a moving object (S10). The coordinate systems $(X_M, Y_M)$, $(X_N, Y_N)$ of the displacement measurement marker are set, and then, general functional formulas for the n-th (n= ..., −3, −2, −1, 0, 1, 2, 3, ...) two lines of the displacement measurement marker at time t=0 are obtained (S20). Subsequently, general equations for the intersection points between the scan line and the n-th two lines are obtained (S30). Two distance ratios of the intersection points for an arbitrary integer of n are obtained from the general equation for the two intersection points (S40). A general equation having a gradient a and a y-intercept b for expressing a functional formula for the scan line is obtained from the two distance ratios (S50).

Then, the displacement measurement marker moving together with the object is continuously photographed by the line scan camera (S60). Two actual distance ratios are obtained from images photographed from a period of time from t=0 to t=t(S70). The two distance ratios obtained at step S70 are substituted into the general equation which is obtained at step S50 and has the gradient a and the y-intercept b so as to obtain an actual functional formula for the scan line (S80). Subsequently, a central coordinate $P_C$ of the scan line is obtained by means of the actual functional formula for the scan line (S90). Then, all the central coordinate $P_C$ of the scan line can be obtained for arbitrary time between t=0 and t=t. From two central coordinates $P_{C1}$ and $P_{C2}$ of the scan line obtained as such, a relative displacement and rotational angle between the central coordinates $P_{C1}$ and $P_{C2}$ are obtained (S100).

As described above, according to the displacement of marker used with the line scan camera and the measurement method using the same, there are advantages in that a two-dimensional planar motion of an object can be measured from one-dimensional linear image data, and the motion of the object which moves at a high speed or on which an impact is exerted can be precisely measured.

Although the present invention has been described with respect to the preferred embodiments, the scope of the present invention is not limited thereto. The specific shapes and constructions of the preferred embodiments are examples of the present invention for the illustrative purposes only. Various modifications and changes may be made thereto without departing from the scope of the invention defined by the appended claims.

What is claimed is:

1. A method for measuring displacement of a moving object by using a line scan camera, comprising the steps of:

fixedly attaching a displacement measurement marker to a surface of the moving object, the marker comprising a plurality of repeatedly arranged figures having the same size and shape, each of the figures being measurable by means of the line scan camera and asymmetric with respect to a direction of a scan line of the line scan camera;

setting coordinate systems of the displacement measurement marker, and obtaining general functional formulas for two lines of an n-th (n= ..., −3, −2, −1, 0, 1, 2, 3, ...) figure of the displacement measurement marker at time t=0;

obtaining general equations for intersection points between the scan line and the n-th two lines;

obtaining two general distance ratios of the intersection points for an arbitrary integer of n from the general equation for the two intersection points;

obtaining a general functional formula for the scan line having a gradient a and a y-intercept b for expressing as a general equation for the arbitrary integer of n from the two distance ratios;

continuously photographing the displacement measurement marker moving together with the object by the line scan camera;

obtaining two actual distance ratios from images photographed by the line scan camera;

substituting the two actual distance ratios obtained from the images into the general equation having the gradient a and the y-intercept b so as to obtain an actual functional formula for the scan line;

obtaining a central coordinate $P_C$ of the scan line by means of the actual functional formula for the scan line; and obtaining a relative displacement and a rotational angle between central coordinates of the scan line obtained for arbitrary time between t=0 and t=t.

2. The method as claimed in claim 1, wherein each of the figures is a right-angled triangle of which base is a horizontal line.

3. The method as claimed in claim 2, wherein the coordinate systems of the displacement measurement marker include a first coordinate system of which an x-axis is coincident with a base of the right-angled triangle, and a second coordinate system rotated by 45 degrees with respect to the first coordinate system.

4. The method as claimed in claim 2, wherein the right-angled triangles are spaced apart from one another at a predetermined interval.

5. The method as claimed in claim 2, wherein a width of a hypotenuse of each of the right-angled triangles is different from that of the base thereof.

6. The method as claimed in claim 1, wherein each of the figures comprises a horizontal line constructing a base thereof, a line for constructing a height perpendicular to the horizontal line, and a curved line for connecting end points of the two lines.

* * * * *